United States Patent [19]
Morris

[11] 3,942,904
[45] Mar. 9, 1976

[54] TELESCOPICALLY AND CIRCUMFERENTIALLY ADJUSTABLE BRACE

[75] Inventor: Max O. Morris, Issaquah, Wash.
[73] Assignee: Kathet Corporation, Seattle, Wash.
[22] Filed: Apr. 19, 1974
[21] Appl. No.: 462,446

[52] U.S. Cl. .............. 403/108; 403/379; 211/176; 248/354 P
[51] Int. Cl.² .................. F16B 7/10; F16D 1/12
[58] Field of Search .......... 403/378, 379, 108, 109, 403/231, 232, 104, 106, 107; 52/753 C, 753 D, 753 R, 758 H; 248/279, 285, 286, 295, 298, 354 P; 211/176

[56] References Cited
UNITED STATES PATENTS

| | | | |
|---|---|---|---|
| 1,471,909 | 10/1923 | Miller | 211/176 |
| 1,820,950 | 9/1931 | Schulstadt | 403/108 X |
| 2,669,497 | 2/1954 | Bailey | 403/231 |
| 3,090,600 | 5/1963 | Smith | 403/108 X |

FOREIGN PATENTS OR APPLICATIONS

| | | | |
|---|---|---|---|
| 536,561 | 12/1955 | Italy | 248/354 P |

Primary Examiner—Thomas F. Callaghan
Assistant Examiner—Wayne L. Shedd
Attorney, Agent, or Firm—Parrott, Bell, Seltzer, Park & Gibson

[57] ABSTRACT

A universal brace for use in bracing a wide variety of members, such as corner joints of furniture and the like, and being characterized by a versatile and adjustable construction, as follows. A body member of two telescoping sections is provided. Rows of transversely extending apertures are formed through each of the sections for providing access passageways through each of the sections disposed at approximately 90° with respect to each other and are positioned for respective alignment of said apertures and said passageways of the sections by adjusting the relative telescopic positions of the sections. A body locking pin is removably inserted through any desired set of aligned apertures and passageways for locking the sections of the body member in desired adjusted length. Devices are provided on the ends of each of the sections of the body member for contacting the members to be braced. Whereby, the brace may be linearly adjusted lengthwise and the sections of the body member may be disengaged and one of the sections rotated and again engaged telescopically with the other of the sections for providing versatility in desired placement of the contacting members on the outer ends of the sections of the body member and versatility in use of the brace.

11 Claims, 9 Drawing Figures

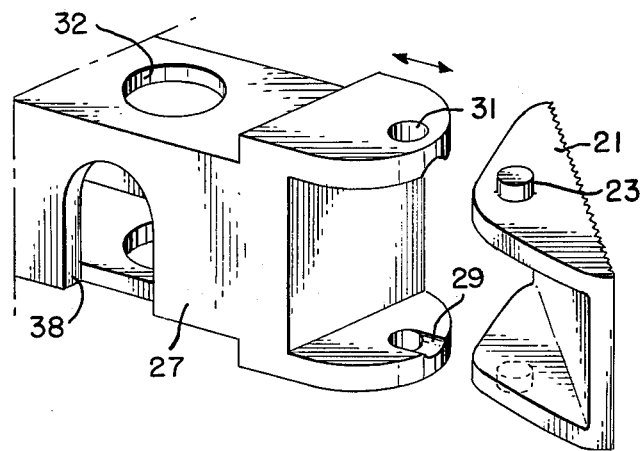
FIG. 6
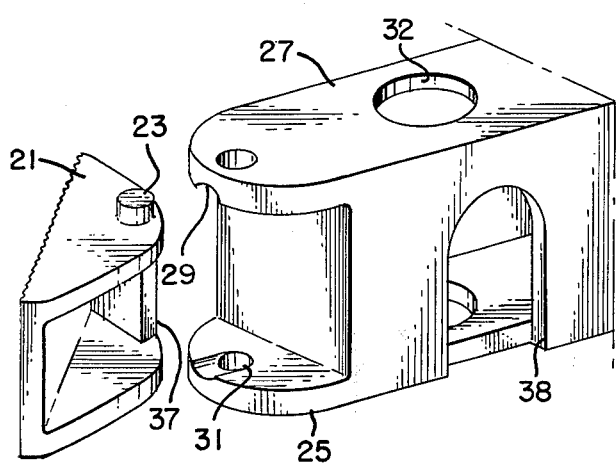
FIG. 7
FIG. 9   FIG. 8
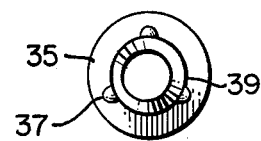
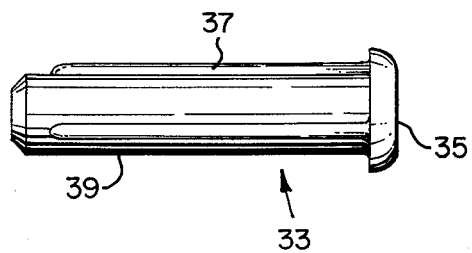

3,942,904

TELESCOPICALLY AND CIRCUMFERENTIALLY ADJUSTABLE BRACE

BACKGROUND OF THE INVENTION

Furniture frames for tables, chairs, and the like have corner joints commonly strengthened by wooden corner blocks that are glued and also may be screwed into the adjoining corner ends. In mass production furniture fabrication, wooden corner blocks must be mass produced and stocked in several sizes. In addition, mass production furniture fabrication requires the use of assembly jigs, and it often has been difficult to obtain a proper fit between pre-assembled frame corners and corner blocks. The use of wooden corner blocks, therefore, causes inventory and assembly problems, and can result in the production of furniture having sub-standard corner joints.

A primary object of this invention is to provide a universal corner block for furniture frames that itself can be mass produced with high quality. A further object is to provide such a corner block that is adaptable for use in a variety of corner joint applications. Another object is to provide such a corner block that is adaptable for use in bracing corner joints that are "out-of-square," intentionally or as a result of mass production fabrication procedures.

The corner block of this invention comprises an extensible body member and end pads pivotally secured to each end of the body member. The body, once extended to the desired length, is locked to that length by means of a body shear pin inserted through the body member.

BRIEF DESCRIPTION OF THE DRAWINGS

FIGS. 6 and 7 depict preferred embodiments of opposite ends of the corner block.

FIGS. 8 and 9 depict a preferred pin structure.

DETAILED DESCRIPTION OF THE DRAWINGS

Figure 1:
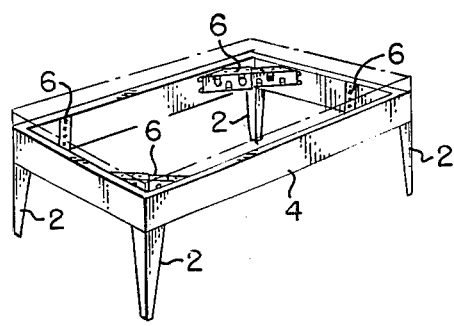
FIG. 1 is a schematic representation of a piece of furniture utilzing the corner block.

As shown in FIG. 1, a piece of furniture which typically uses a corner block is a table or desk frame comprising a plurality of legs 2 and a generally horizontal frame member 4 which interconnects the legs to form the rectangular base for the tope of the desk or table. Corner blocks 6 are utilized at each of the corners of the rectangular base for the top of the desk or table. Corner blocks 6 are utilized at each of the corners of the rectangular framework, thereby increasing the strength and rigidifying the total structure.

Figure 2:
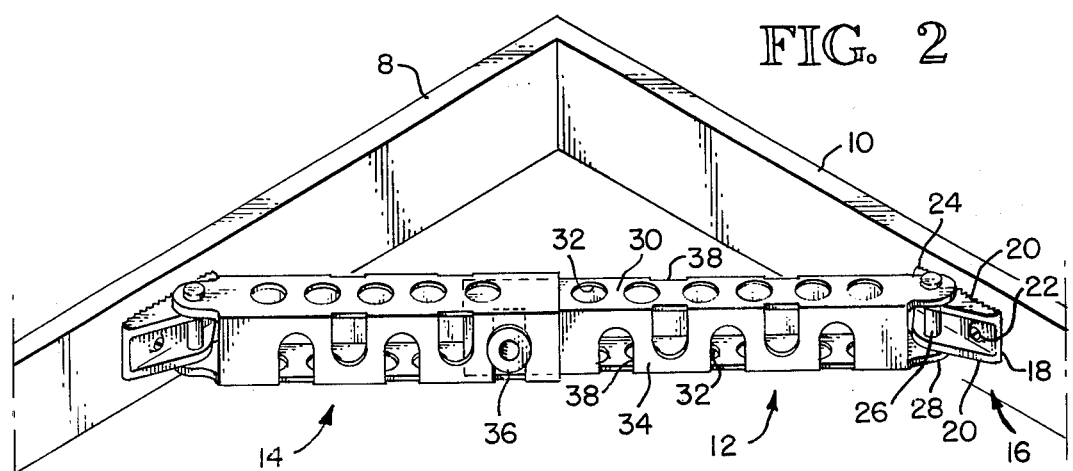
FIG. 2 is an isometric view of the corner block having two telescopic body member sections shown in position between two adjacent members of a piece of furniture.

As shown in FIG. 2, one embodiment of the corner block comprises an extensible body member consisting of two sections, 12 and 14, section 12 inserted within and extending from section 14, an end pad 16 pivotally secured to the outer end of each body member section, and a body shear pin 36 inserted through both body member sections to lock the sections together.

Each end pad 16 preferably comprises a base 18 that provides an outer contact surface 24, roughened as by serration, to afford good adherence to a corner structure, and a pair of stiffening flanges 20 to which is secured a pivot pin 26 in a manner such that the ends of pin 26 protrude beyond the flanges 20. A raised boss on the inside of base 18 is provided with an opening for insertion of a screw 22.

Each body member section 12 and 14 comprises an elongated structure of hollow rectangular configuration with opposing side walls 30 being provided with centered and spaced circular openings 32 and with the other opposing side walls 34 being provided with spaced slots 38, and opposing protruding lugs 28 integral with the structure. The lugs are provided with openings which contain the ends of pins 26 and enable the pads 16 to pivot.

The slots 38 commence straight sided at the outer plane of one of the walls 30 and extend inwardly to a semicircular end centered in the wall 34. The slots 38 alternate with every other slot commencing at one wall 30 and with intervening slots commencing at the opposite wall 30. The slots 38 and openings 32 are arranged in alternate pairs, such that two pairs of top-to-bottom openings 32 are separated by a pair of side-to-side slots 38.

This arrangement of openings 32 and slots 38 provides a wide choice of locking positions. For example, in the position shown in FIG. 2, shear pin 36 is extended through a set of slots 38 of sections 12 and 14, the slot sets being aligned such that the slots of section 14 extend from the bottom wall 30 and the slots of section 12 extend from the top wall 30 to overlap in a manner providing circular apertures through which the shear pin 36 extends. Alternately, the shear pin 36 could have been inserted through the aligned circular openings 30 of both sections, perpendicularly to the pin orientation shown in FIG. 2. In the event that slots 38 extending from the same direction are aligned, shear pin 36 must be inserted through the aligned circular openings 32 because of the aligned slots 38 would not provide circular apertures for lateral support of the shear pin.

If the cross-section of each body member section 12 and 14 is square, the section 12 may be telescopically inserted into section 14 at a 90° orientation to that shown in FIG. 2. Thus openings 32 would align with slots 38. This configuration would be desirable in the case where pads 16 should be oriented perpendicularly to one another.

Figure 3:
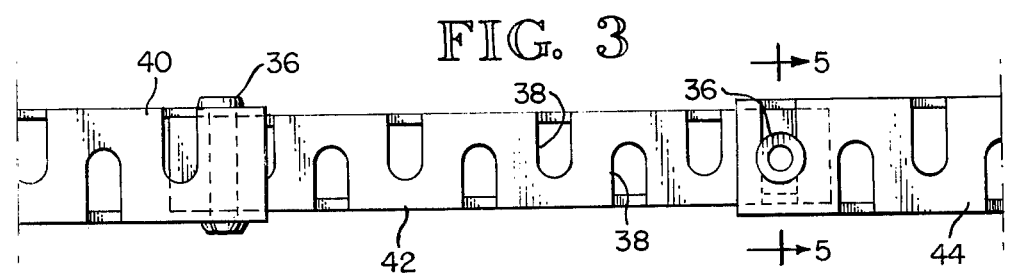
FIG. 3 is a representation of a modified corner block having an intermediate body ember section to extend the total length of the block.
Figures 4, 5:
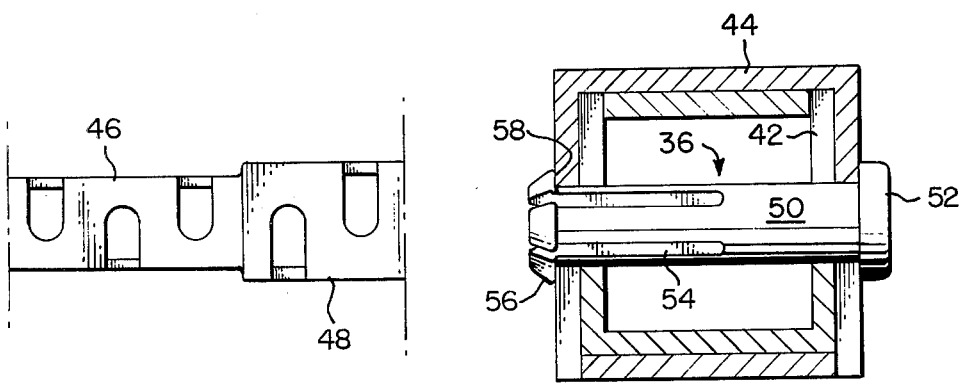
FIG. 4 is a partial view showing yet another form of an intermediate body member section.
FIG. 5 is a sectional view along lines 5—5 of FIG. 3, specifically illustrating the pin structure for locking the block in a predetermined length.

FIG. 3 depicts an intermediate body member section 42 telescopically joining two sections 40 and 44 and locked in position by two shear pins 36, 36. The body member sections 40 and 44 could be fabricated similarly to sections 14 of FIG. 2. FIG. 4 depicts another intermediate section configuration wherein the intermediate section 46 is integral with one outer end section 48.

As depicted in FIG. 5, the body shear pin 36 comprises a small diameter tubular shaft 50 having a head 52 at one end and a tapered tip 56 at the other end provided with an inner shoulder 58 adapted to seat against a wall outer surface such as the outer surface of section 44. The tip 56 and adjacent portion of shaft 50 are slotted as at 54 to permit the tip to be constricted as it is forced through the openings and to snap back into the locking configuration shown in FIG. 5.

FIGS. 6 and 7 illustrate a preferred end pad structure 21 wherein the stiffening flanges are provided with outwardly protruding integral bosses 23 rather than the pivot pins 26 of FIG. 2. Also shown in FIG. 7, the end pad flanges may be reinforced by a transverse web 37.

FIGS. 6 and 7 also illustrate preferred outer end configurations of the body member sections 25, 27. Body member section 27, being insertable within body member section 25 and therefore of smaller cross section, is provided with stepped lugs such that both body members can be secured to end pads of identified dimensions. Both body member lugs have aligned aperture 31 which are intersected by snap-in ramps 29 to facilitate attachment insertion of body member section bosses 23 into apertures 31.

FIGS. 6 and 7 also depict an alternative alignment of slots 38 and openings 32. As shown, adjacent slots and openings are centered or aligned rather than staggered as shown in FIG. 2.

FIGS. 7 and 8 depict an alternate shear pin configuration wherein the pin shaft 39 is provided with three elongated raised bosses 37 equi-spaced around the shaft. The shaft 39 and bosses 37 provide an interference fit when inserted through the body member sections.

All elements of the corner base are preferably molded, particularly of plastic.

The embodiments of the invention in which a particular property or privilege is claimed are defined as follows:

1. A universal brace for use in bracing a wide variety of members, such as corner joints of furniture and the like, comprising:
   an elongate, longitudinally extending, body member comprising two sections in which at least a portion of one of said sections is slidably telescopically contained within the other of said sections for adjustable extension and contraction of the overall length of said body member;
   rows of transversely extending apertures formed through each of said sections for providing access passageways through each of said sections disposed at approximately 90° with respect to each other and being positioned for respective alignment of said apertures and passageways of any of said rows said one section with said apertures and passageways of said other section by adjusting the relative telescopic positions of said sections;
   a body locking pin for removable insertion through any desired set of said aligned apertures and passageways for locking said sections of said body member in the desired adjusted length; and
   means on the outer ends of each of said sections of said body member for contacting the members to be braced;
   whereby, said brace may be linearly adjusted lengthwise and said sections of said body member may be disengaged and one of said sections rotated and again engaged telescopically with the other of said sections for versatility in desired placement of said contacting means on the outer ends of said sections of said body member and versatility in use of said brace.

2. A universal brace, as set forth in claim 1, in which each of said sections of said body member comprises
   an elongate structure of hollow rectangular configuration in cross-section having pairs of opposing side walls, and
   said apertures in each of said sections incude spaced slots formed in one pair of opposing side walls of each of said sections, each of said slots extending from one edge of said wall inwardly to a centered semi-circular inner end and every other of said slots being oriented in the opposite direction such that slots of opposite orientation in adjacent body member section walls may be aligned to provide a centered circular aperture through adjacent walls for receiving said body locking pin.

3. A universal brace, as set forth in claim 1 in which each of said sections of said body member comprise
   an elongate structure of hollow rectangular configuration in cross-section having pairs of opposing side walls, and
   said apertures in each of said sections include spaced, generally circular openings formed in one pair of opposing side walls of each of said sections such that said openings in adjacent body member section walls may be aligned to provide a centered circular aperture through the adjacent walls for receiving said body locking pin.

4. A universal brace, as set forth in claim 1, in which said means on the outer ends of each of said sections of said body member for contacting the members to be braced comprises
   pad members having a base surface for contacting the members to be braced, and
   means pivotally mounting each of said pad members on the outer end of the said respective section of said body member so that each of said pad members may be pivoted to place said base surface into contact with the respective members to be braced.

5. A universal brace, as set forth in claim 4, in which said base surface of each of said pad members comprises a roughened surface for providing good adherence to the respective members to be braced.

6. A universal brace, as set forth in claim 1, in which each of said sections of said body member comprises a high impact plastic, elongate structure of hollow rectangular configuration in cross-section.

7. A universal brace, as set forth in claim 1, further including
   a third section forming a portion of said body member and being slidably telescopically associated with one of said other two sections for providing additional overall length to said body member;
   rows of transverse apertures extending through said third section for providing access passageways therethrough and being positioned for respective alignment with said one of the other two sections, and
   a second body locking pin for removable insertion through a desired set of said aligned apertures of said third section and said one of the other two sections for locking of said body member in the desired adjusted length.

8. A universal brace for use in bracing a wide variety of members, such as corner joints of furniture and the like, comprising:
   an elongate, longitudinally extending, body member comprising two sections of high impact plastic defining a hollow square configuration in cross-section and having pairs of opposing walls and in which at least a portion of one of said sections is slidably telescopically contained within the other of said sections for adjustable extension and contraction of the overall length of said body member;

a row of transversely extending apertures formed through each of said walls of each of said sections for providing access passageways therethrough disposed at approximately 90° with respect to each other and being positioned for respective alignment of said apertures of one section with said apertures of said other section to provide transverse passageways through opposing and adjacent side walls of each of said sections by adjusting the relative telescopic positions of said sections, a body locking pin for removable insertion through a desired set of said aligned apertures and passageways for locking said sections of said body member in desired adjusted lengths; and means on the outer ends of each of said sections of said body member for contacting the members to be braced;

whereby, said brace may be linearly adjusted lengthwise and said sections of said body member may be disengaged and one of said sections rotated in 90° increments and again engaged telescopically with the other of said section for versatility in desired placement of said contacting means on the outer ends of said sections of said body member and versatility in use of said brace.

9. A universal brace for use in bracing a wide variety of members, such as corner joints of furniture and the like, comprising:

an elongate, longitudinally extending, body member comprising two sections of high impact plastic defining a hollow rectangular configuration in cross-section having pairs of opposing walls and in which at least a portion of one of said sections is slidably telescopically contained within the other of said sections for adjustable extension and contraction of the overall length of said body member;

a row of transversely extending apertures formed through each of said walls of each of said sections for providing access passageways therethrough disposed at approximately 90° with respect to each other and being positioned for respective alignment of said apertures of one section with said apertures of said other section to provide transverse passageways through opposing and adjacent side walls of each of said sections by adjusting the relative telescopic positions of said sections, said apertures comprising spaced slots formed in one pair of opposing side walls of each of said sections and extending from one side edge of said wall inwardly to a centered, semi-circular inner end with every other of said slots being oriented in the opposite direction, and circular openings formed in the other pair of opposing side walls of each of said sections, so that aligned apertures in opposing and adjacent side walls of each of said sections will form a centered circular aperture through said body member;

a body locking pin for removable insertion through a desired set of said aligned apertures and passageways for locking said sections of said body member in desired adjusted length; and a pad member associated with the outer end of each of said sections of said body member and having a base surface for contacting the members to be braced and including means pivotally mounting each of said pad members on the outer end of said respective section of said body member so that each of said pad members may be pivoted to place said base surface into contact with the respective members to be braced;

whereby, said brace may be linearly adjusted lengthwise and said sections of said body member may be disengaged and one of said sections rotated and again engaged telescopically with the other of said section for versatility in desired placement of said pad members and versatility in use of said brace.

10. A universal brace for use in bracing a wide variety of members such as corner joints of furniture and the like, said brace comprising:

an elongate, longitudinally extending, body member comprising two sections in which at least a portion of one of said sections is slidably telescopically contained within the other of said sections for adjustable extension and contraction of the overall length of said body member and defining opposite outer ends on said body member;

a plurality of transversely extending apertures formed through said sections for providing access passageways therethrough and being positioned for respective alignment of said apertures of said sections by adjusting the relative telescopic positions of said sections;

a body locking pin for removable insertion through a desired set of said aligned apertures for locking said sections of said body member in the desired adjusted length;

spaced apart, outwardly and longitudinally extending lug means formed on each of said opposite outer ends of said body member and having a transversely extending aperture through each of said lug means;

a pad member associated with each of said opposite outer ends of said body member and having a base surface for contacting the members to be braced, spaced, inwardly extending flange members, and upstanding boss members on each of said flange members for being pivotally received within said apertures in said lug members on each of said opposite outer ends of said body member for pivotally mounting said pad members on said opposite outer ends of said body member, so that said pad members may be easily snapped into and out of engagement with said lug members on said opposite outer ends of said body member.

11. A universal brace for use in bracing a wide variety of members, such as corner joints of furniture and the like, comprising:

an elongate, longitudinally extending, body member comprising two sections in which at least a portion of one of said sections is slidably telescopically contained in the other of said sections for adjustable extension and contraction of the overall length of said body member;

a plurality of transversely extending apertures formed through each of said sections for providing access passageways therethrough and being positioned for respective alignment of said apertures of said one section with said apertures of said other section by adjusting the respective telescopic postions of said sections;

a body locking pin for removable insertion through a desired set of said aligned apertures for locking said sections of said body member in desired adjusted length;

one of said sections of said body member comprising an elongate structure of generally rectangular configuration in cross-section having pairs of opposing side walls, and said apertures in said one of said sections comprising spaced slots formed in one pair of said opposing side walls, each of said slots extending from one edge of said wall inwardly to a centered semi-circular end and every other of said slots being oriented in the opposite direction for providing a centered circular aperture through said section for receiving said body locking pin; and means on the other ends of each of said sections of said body member for contacting the members to be braced.

* * * * *